United States Patent [19]
Dirisio et al.

[11] Patent Number: 6,074,106
[45] Date of Patent: Jun. 13, 2000

[54] CAMERA WITH BLOCKING DEVICE TO PREVENT ACCIDENTAL SHUTTER OPENING DUE TO MECHANICAL SHOCK SUCH AS WHEN CAMERA JARRED OR DROP

[75] Inventors: Anthony Dirisio, Rochester; Thomas S. Albrecht, Canandaigua, both of N.Y.

[73] Assignee: Eastman Kodak Company, Rochester, N.Y.

[21] Appl. No.: 09/283,407

[22] Filed: Apr. 1, 1999

[51] Int. Cl.⁷ .................................................. G03B 9/08
[52] U.S. Cl. ........................... 396/453; 396/465; 396/493
[58] Field of Search .................................. 396/452, 453, 396/454, 6, 465, 503, 493, 395

[56] References Cited

U.S. PATENT DOCUMENTS

| | | |
|---|---|---|
| 437,290 | 9/1890 | Colgate . |
| 463,284 | 11/1891 | Burrows . |
| 501,866 | 7/1893 | Brownell . |
| 529,369 | 11/1894 | Delug . |
| 2,249,517 | 7/1941 | Crumrine . |
| 3,081,683 | 3/1963 | Horton et al. . |
| 3,319,554 | 5/1967 | Bresson et al. . |
| 3,474,716 | 10/1969 | Wurster . |
| 3,678,839 | 7/1972 | Michealis . |
| 4,112,451 | 9/1978 | Asker ...................................... 396/503 |
| 4,114,175 | 9/1978 | Huber et al. . |
| 4,403,844 | 9/1983 | Namai .................................... 396/465 |
| 4,962,398 | 10/1990 | Sorg et al. . |
| 5,255,037 | 10/1993 | Kobayashi . |
| 5,365,298 | 11/1994 | Fox ........................................ 396/453 |
| 5,721,995 | 2/1998 | Katsura et al. . |
| 5,890,026 | 3/1999 | Smith et al. ............................ 396/493 |
| 5,991,552 | 11/1999 | Balling et al. .......................... 396/395 |

*Primary Examiner*—Russell Adams
*Attorney, Agent, or Firm*—Roger A. Fields

[57] ABSTRACT

A camera comprising an aperture through which ambient light is passed to cause a film exposure, a shutter blade pivotable open to uncover the aperture to permit ambient light to pass through the aperture and pivotable closed to re-cover the aperture and susceptible of being moved accidentally due to mechanical shock such as when the camera is dropped or jarred, and a shutter actuator movable to pivot the shutter blade open to uncover the aperture, is characterized in that a blocking device is positioned within a blocking range of the shutter blade to block the shutter blade from being pivoted open to uncover the aperture when the shutter blade is moved accidentally due to mechanical shock, and the shutter blade is supported to be moved out of the blocking range of the blocking device when the shutter actuator is moved to pivot the shutter blade open to uncover the aperture.

10 Claims, 10 Drawing Sheets

CAMERA WITH BLOCKING DEVICE TO PREVENT ACCIDENTAL SHUTTER OPENING DUE TO MECHANICAL SHOCK SUCH AS WHEN CAMERA JARRED OR DROP

CROSS-REFERENCE TO RELATED APPLICATION

Reference is made to commonly assigned co-pending application Ser. No. 09/283,741 entitled SHUTTER MECHANISM PREVENTS ACCIDENTAL SHUTTER OPENING DUE TO PHYSICAL SHOCK and filed Apr. 1, 1999 in the names of Stephen J. Smith, James D. Boyd and Michael P. Cramer.

FIELD OF THE INVENTION

The invention relates generally to the field of photography, and in particular to cameras. More specifically, the invention relates to a camera that can prevent accidental shutter opening due to mechanical shock such as when the camera is jarred or dropped.

BACKGROUND OF THE INVENTION

It is conventional for a camera to have an aperture through which ambient light is passed to cause a film exposure, at least one shutter blade pivotable open to uncover the aperture to permit ambient light to pass through the aperture and pivotable closed to re-cover the aperture, a shutter actuator movable to pivot the shutter blade open to uncover the aperture, and a shutter release button manually depressible to initiate movement of the shutter actuator.

Problem

In relatively inexpensive simple cameras, for example a one-time-use or disposable camera, the shutter blade is susceptible of being moved open accidentally, i.e. without the shutter release button having been manually depressed. This can be caused by a mechanical shock to the camera such as when the camera is dropped or jarred. The result is an unintended wasted exposure.

The Cross-Referenced Application

The cross-referenced application discloses a shutter mechanism comprising an aperture through which ambient light is passed to cause a film exposure, a pair of shutter blades supported for pivotal opening movement in opposite opening directions away from one another to uncover the aperture to permit ambient light to pass through the aperture and for pivotal closing movement in return closing directions towards one another to re-cover the aperture and supported to allow them to be pivoted simultaneously in the same direction to cause accidental shutter opening when a physical shock is applied to the shutter blades in the opening direction of one of the shutter blades, is characterized in that each one of the shutter blades completely covers the aperture in order that both of the shutter blades must be removed from the aperture to uncover the aperture to permit ambient light to pass through the aperture, and a single fixed stop is positioned between the shutter blades to prevent either one of the shutter blades from pivoting in the same direction as the other shutter blade to uncover the aperture when one of the shutter blades is pivoted in its opening direction, whereby when one of the shutter blades is pivoted in its opening direction because a physical shock is applied to the shutter blades in that direction the fixed stop prevents the other blade from pivoting in the same direction to cause accidental shutter opening.

SUMMARY OF THE INVENTION

According to the invention a camera comprising an aperture through which ambient light is passed to cause a film exposure, a shutter blade movable open to uncover the aperture to permit ambient light to pass through the aperture and movable closed to re-cover the aperture and susceptible of being moved accidentally due to mechanical shock such as when the camera is dropped or jarred, and a shutter actuator movable to move the shutter blade open to uncover the aperture, is characterized in that:

a blocking device is positioned adjacent the shutter blade to prevent the shutter blade from being moved open to uncover the aperture when the shutter blade is moved accidentally due to mechanical shock, and to permit the shutter blade to be moved open to uncover the aperture when the shutter actuator is moved to move the shutter blade open.

DETAILED DESCRIPTION OF THE INVENTION

Figure 1:
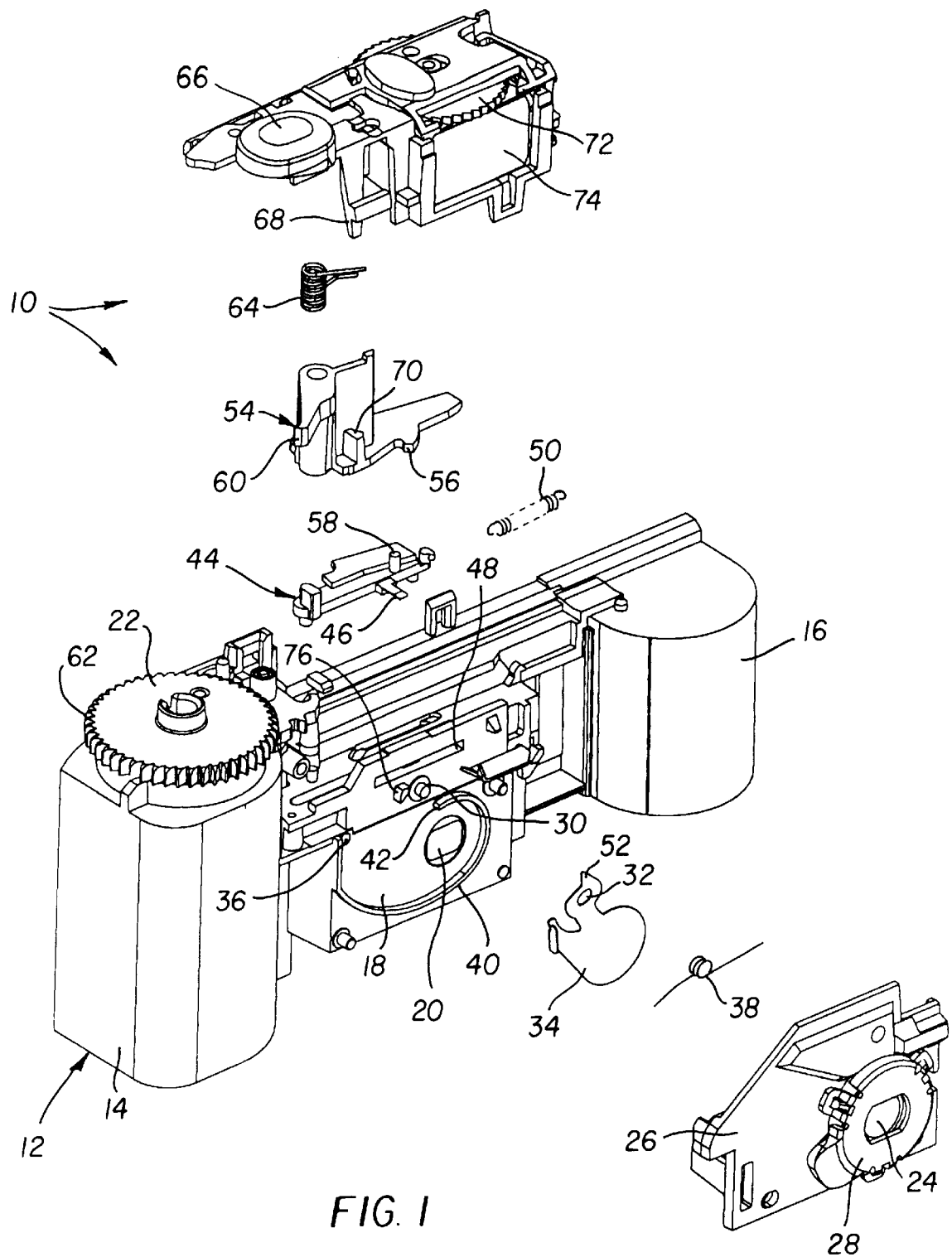
FIG. 1 is an exploded front perspective view of a one-time-use camera with a blocking device to prevent accidental shutter opening due to mechanical shock such as when the camera is dropped or jarred according to a preferred embodiment of the invention.

The invention is disclosed as being embodied preferably in a relatively simple inexpensive camera such as a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–10 partially show a one-time-use camera 10.

The one-time-use camera 10 is a simple point-and-shoot camera that includes an opaque plastic main body part 12 shown in FIG. 1. The main body part 12 has a rearwardly-open cartridge receiving chamber 14 that contains a conventional film cartridge (not shown), a rearwardly-open film supply chamber 16 that contains an unexposed filmstrip (not shown) which is prewound during camera manufacture from the film cartridge onto a film spool in the film supply chamber, and a rearwardly-open exposure chamber 18 behind a front aperture 20 through which ambient light is passed to expose successive imaging sections of the filmstrip.

A film winding thumbwheel 22 is rotatably engaged with a film spool inside the film cartridge in the cartridge receiving chamber 14. The film winding thumbwheel 22 is manually rotated counter-clockwise in FIG. 1 to wind each imaging section of the filmstrip exposed at the exposure chamber 18 into the film cartridge and to advance a fresh imaging section of the filmstrip from the film supply chamber 16 to the exposure chamber.

A fixed-focus taking lens 24 is held between a lens plate 26 and a lens retainer 28 which are connected together. The lens plate 26 is connected to the main body part 12 to position the taking lens 24 over the aperture 20.

Figure 2:
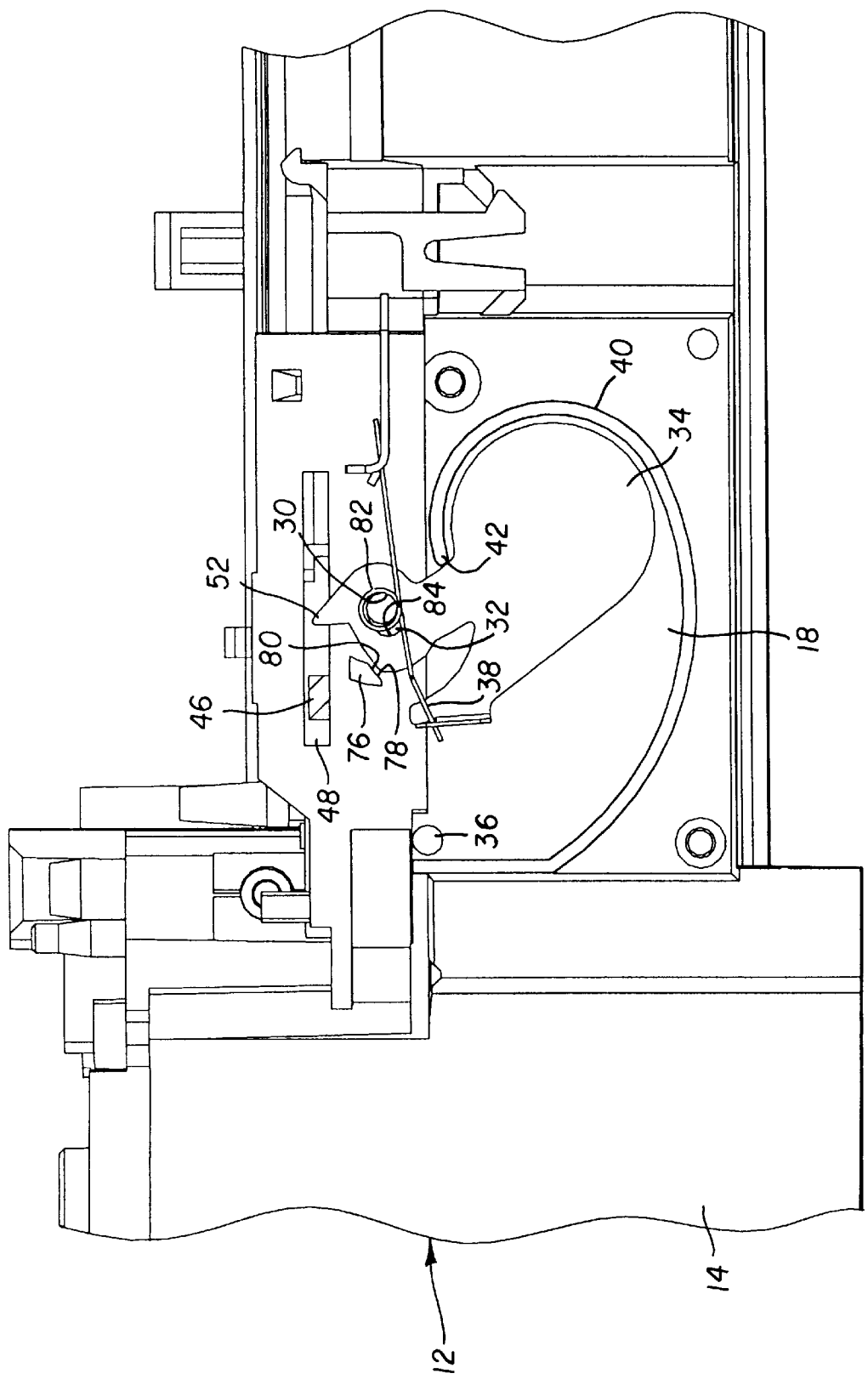
FIG. 2 is a front elevation view of the camera.

A fixed pivot pin 30 on the main body part 12 projects into a straight or slightly curved closed-end slot 32 in a shutter blade 34 to support the shutter blade for translation and pivoting. The shutter blade 34 is pivoted open clockwise in FIGS. 5 and 6 to against a limit stop 36 on the main body part 12, to uncover the aperture 20 to permit ambient light to pass from the taking lens 24 through the aperture, and is pivoted closed counter-clockwise in FIGS. 7 and 8 to re-cover the aperture. A closing spring 38 biases the shutter blade 34 to be pivoted closed to re-cover the aperture 20. A light-intercepting rib 40 partially surrounds the shutter blade 34 when the shutter blade is closed as shown in FIG. 2, and has a blade stop end 42 against which the closing spring 38 urges the shutter blade in FIG. 2.

A shutter actuator 44 has an actuating protuberance 46 that protrudes from a straight closed-end slot 48 in the main body part 12. An actuating spring 50 biases the shutter actuator 44 to the right in FIGS. 2–7 to advance the actuating protuberance 46 against a tang 52 on the shutter blade 34 to pivot the shutter blade open to uncover the aperture 20.

Figure 3:
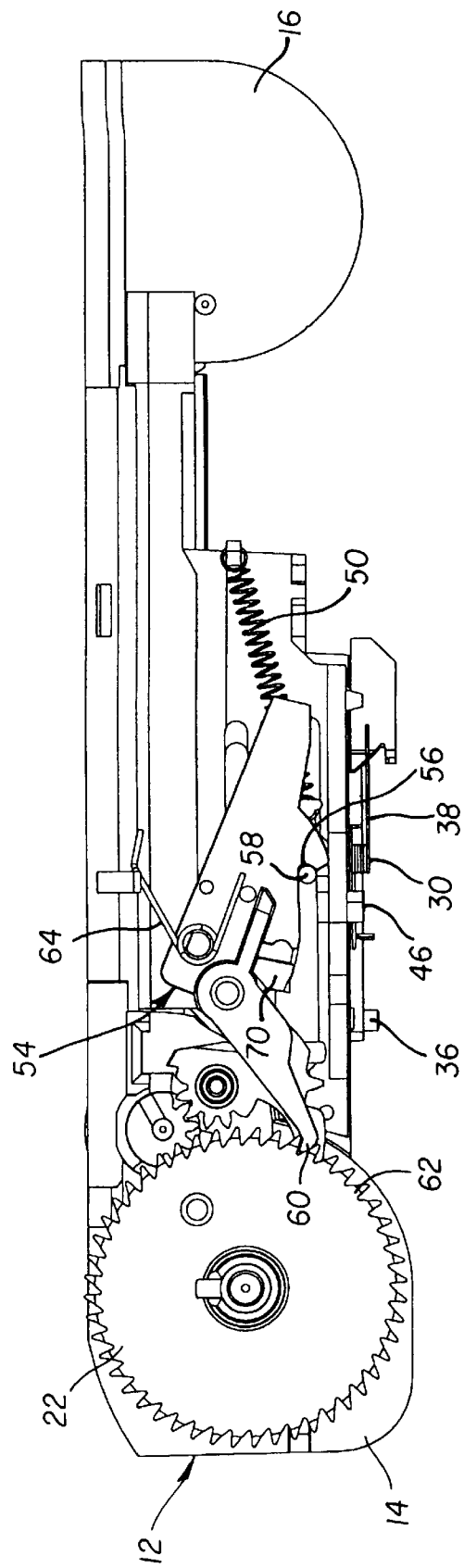
FIG. 3 is a top plan view of the camera.

A locking member 54 has an actuator lock 56 that engages the shutter actuator 44 at an upstanding pin 58 on the shutter actuator to prevent the shutter actuator from being moved to the right in FIGS. 2–7 by the actuating spring 50, and has a thumbwheel lock 60 that engages any one of a continuous array of peripheral teeth 62 on the film winding thumbwheel 22 to prevent the film winding thumbwheel from being manually rotated counter-clockwise in FIGS. 1 and 3 to wind the last imaging section of the filmstrip exposed at the exposure chamber 18 into the film cartridge in the cartridge receiving chamber 14 and to advance a fresh imaging section of the filmstrip from the film supply chamber 16 to the exposure chamber. A return spring 64 biases the locking member 54 to pivot clockwise in FIGS. 1 and 3 for the actuator lock 56 to engage the upstanding pin 58 on the shutter actuator 44 and for the thumbwheel lock 60 to engage any one of the peripheral teeth 62 on the film winding thumbwheel 22.

A cantilevered shutter release button 66 is manually depressible and has a depending projection 68 that is swung against an upstanding projection 70 on the locking member 54 to pivot the locking member counter-clockwise in FIGS. 1 and 3 for the actuator lock 56 to disengage from the upstanding pin 58 on the shutter actuator 44 and for the thumbwheel lock 60 to disengage from any one of the peripheral teeth 62 on the film winding thumbwheel 22.

A rotatable frame counter 72 for indicating the number of exposures remaining to be made on the filmstrip is positioned above a viewfinder 74 for viewing the subject to be photographed.

Figure 10:
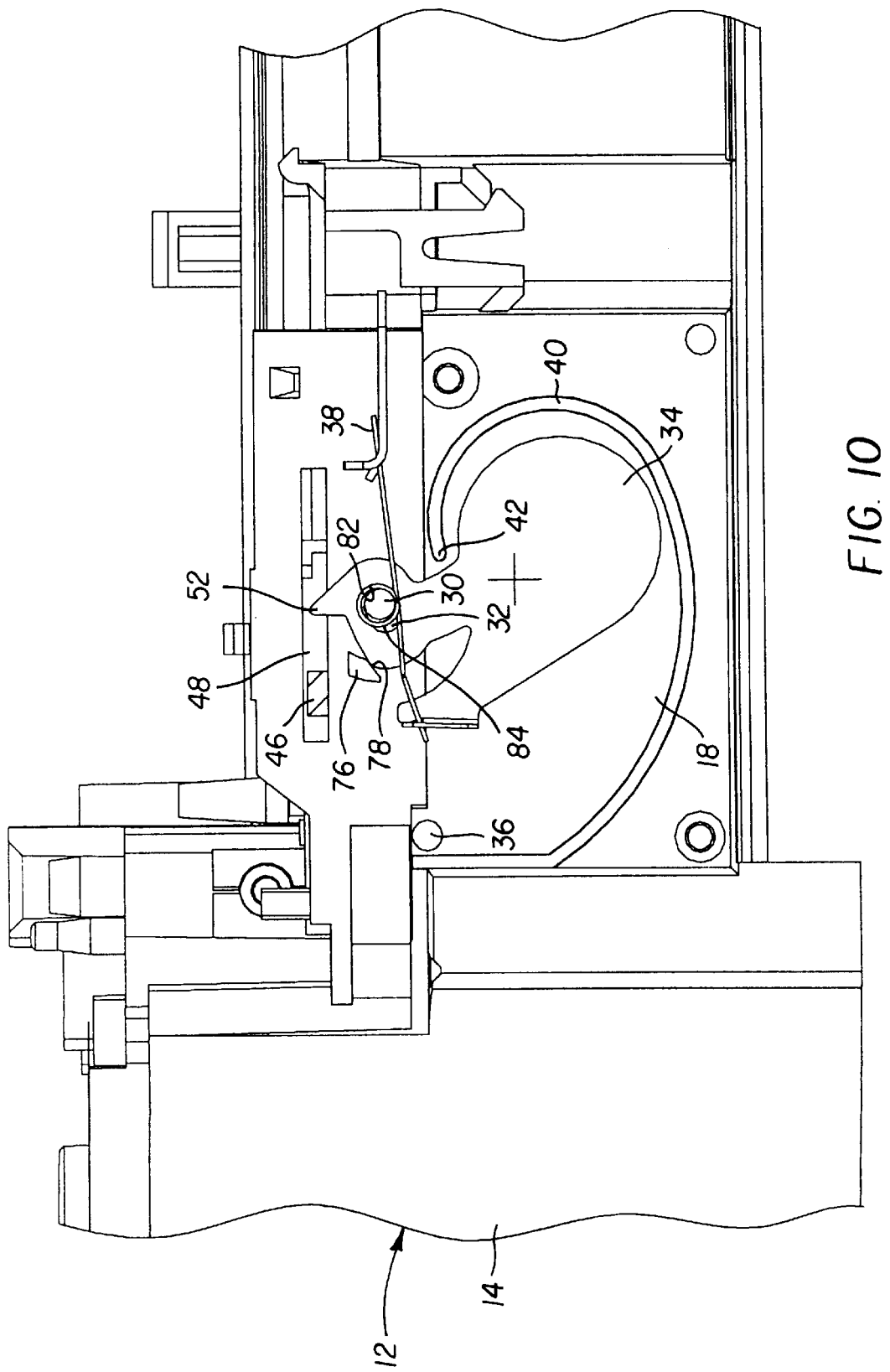
FIG. 10 is a front elevation view of the camera similar to FIG. 2, showing how the blocking device prevents accidental shutter opening.

A fixed blocking device 76 on the main body part 12 has an inclined blocking edge 78 positioned with a blocking range, i.e. the slight clearance space or gap 80 in FIG. 2, of the shutter blade 34 to prevent the shutter blade from being moved open to uncover the aperture 20 when the shutter blade is moved accidentally due to mechanical shock, such as when the camera is dropped or jarred, as in FIG. 10, and to permit the shutter blade to be moved open to uncover the aperture when the shutter actuator 44 is moved to move the shutter blade open, as in FIGS. 2–6.

A pair of opaque plastic front and rear cover parts (not shown) house the main body part 12.

Operation

Beginning with FIGS. 1 and 3, when the shutter release button 68 is manually depressed its depending projection 68 is swung against the upstanding projection 70 on the locking member 54 to pivot the locking member counter-clockwise in FIGS. 1 and 3 for the actuator lock 56 to disengage from the upstanding pin 58 on the shutter actuator 44 and for the thumbwheel lock 60 to disengage from any one of the peripheral teeth 62 on the film winding thumbwheel 22.

Figure 4:
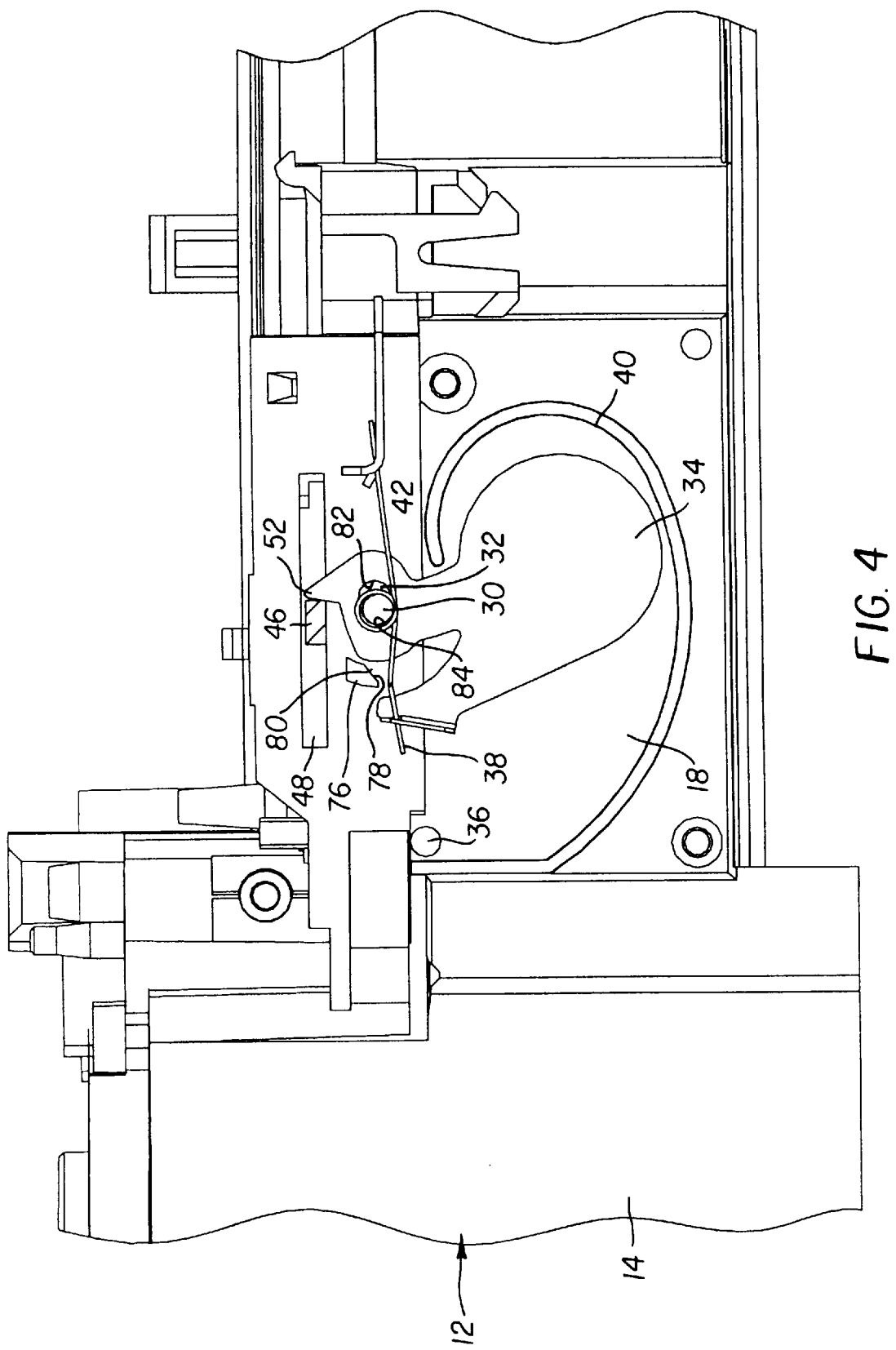
FIGS. 4–9 are front elevation views similar to FIG. 2, showing normal shutter opening and closing to make an exposure.

The actuating spring 50 then moves the shutter actuator 44 to the right in FIGS. 2–4 to advance the actuating protuberance 46, which protrudes from the slot 48 in the main body part 12, against the tang 52 on the shutter blade 34. The shutter blade 34 is then translated slightly to the right in FIG. 4 to change from a first closed end 82 of the slot 32 in the shutter blade being against the pivot pin 30 to a second closed end 84 of the slot being against the pivot pin. This moves the shutter blade 34 out of the blocking range 80 of the inclined blocking edge 78, as shown in FIG. 4. Also, the shutter blade 34 is slightly pivoted clockwise in FIG. 4 to separate from the blade stop end 42 of the light-intercepting rib 40.

Figure 5:
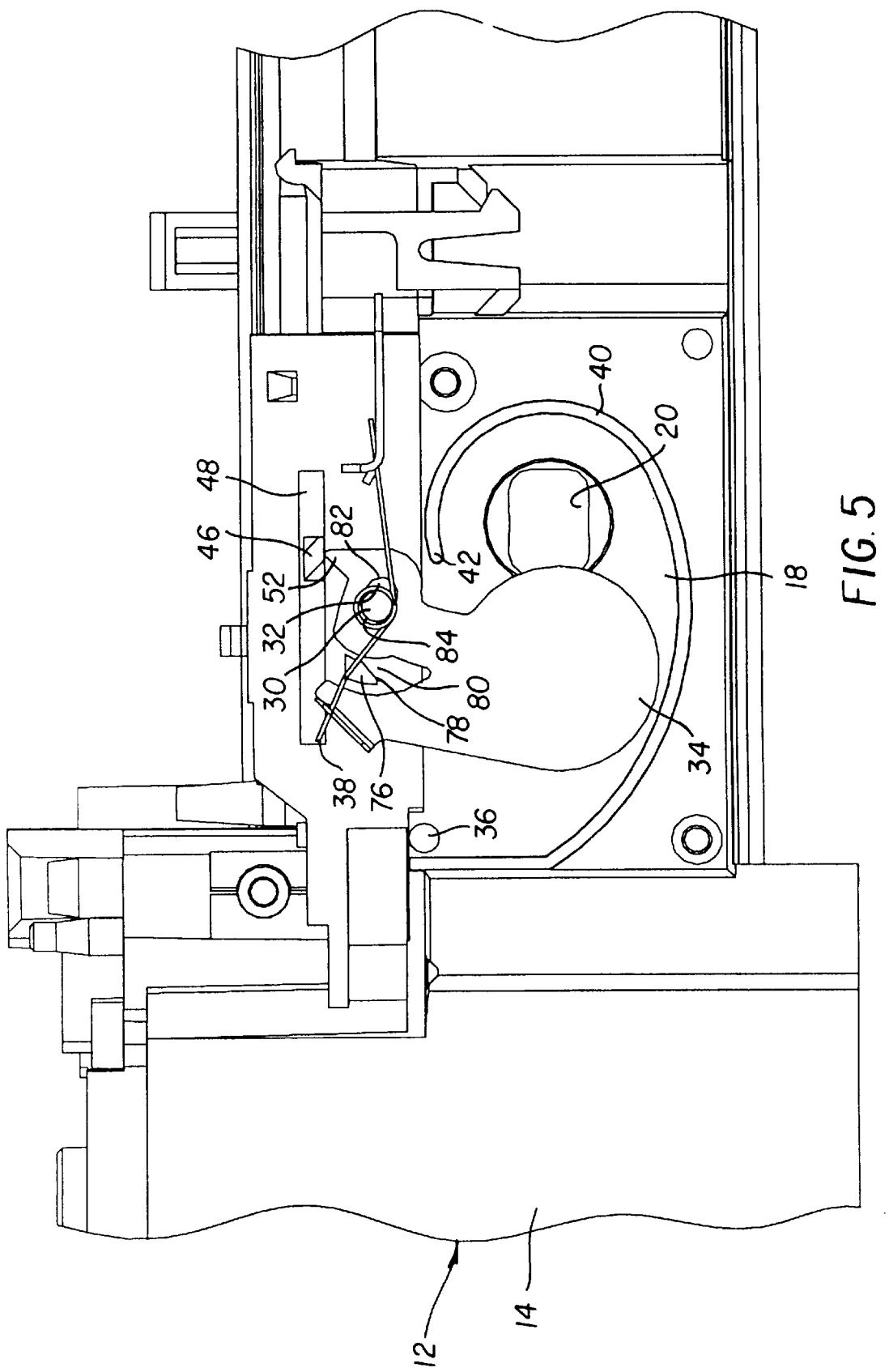
Figure 6:
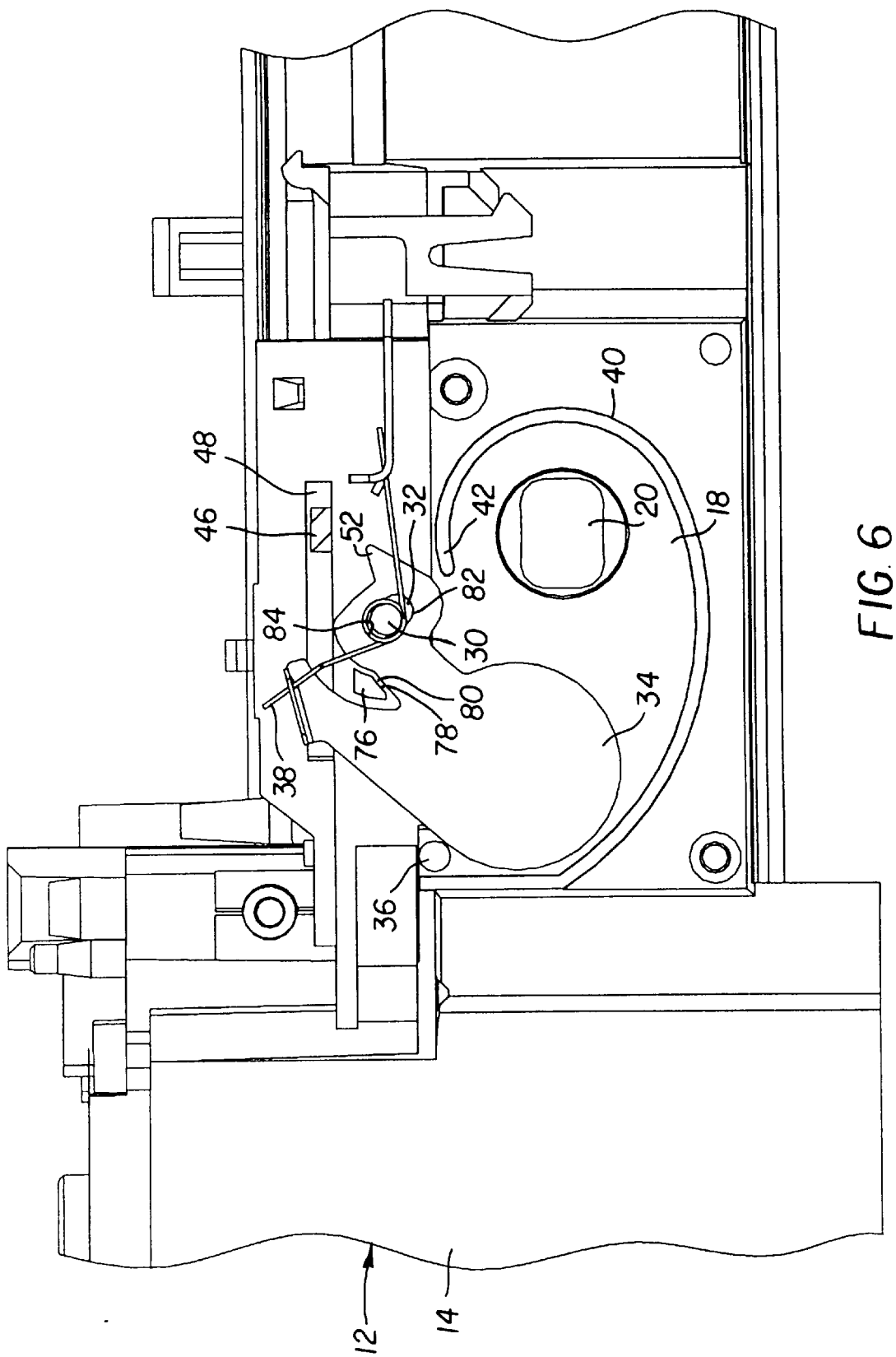

In FIGS. 5 and 6, the actuating spring 50 moves the shutter actuator 44 further to the right which causes the shutter blade 34 to be pivoted open clockwise against the limit stop 36 to uncover the aperture 20. The shutter blade 34 is pivoted open with the second closed end 84 of the slot 32 in the shutter blade being against the pivot pin 30. Thus, the shutter blade 34 remains out of the blocking range 80 of the inclined blocking edge 78.

Figure 7:
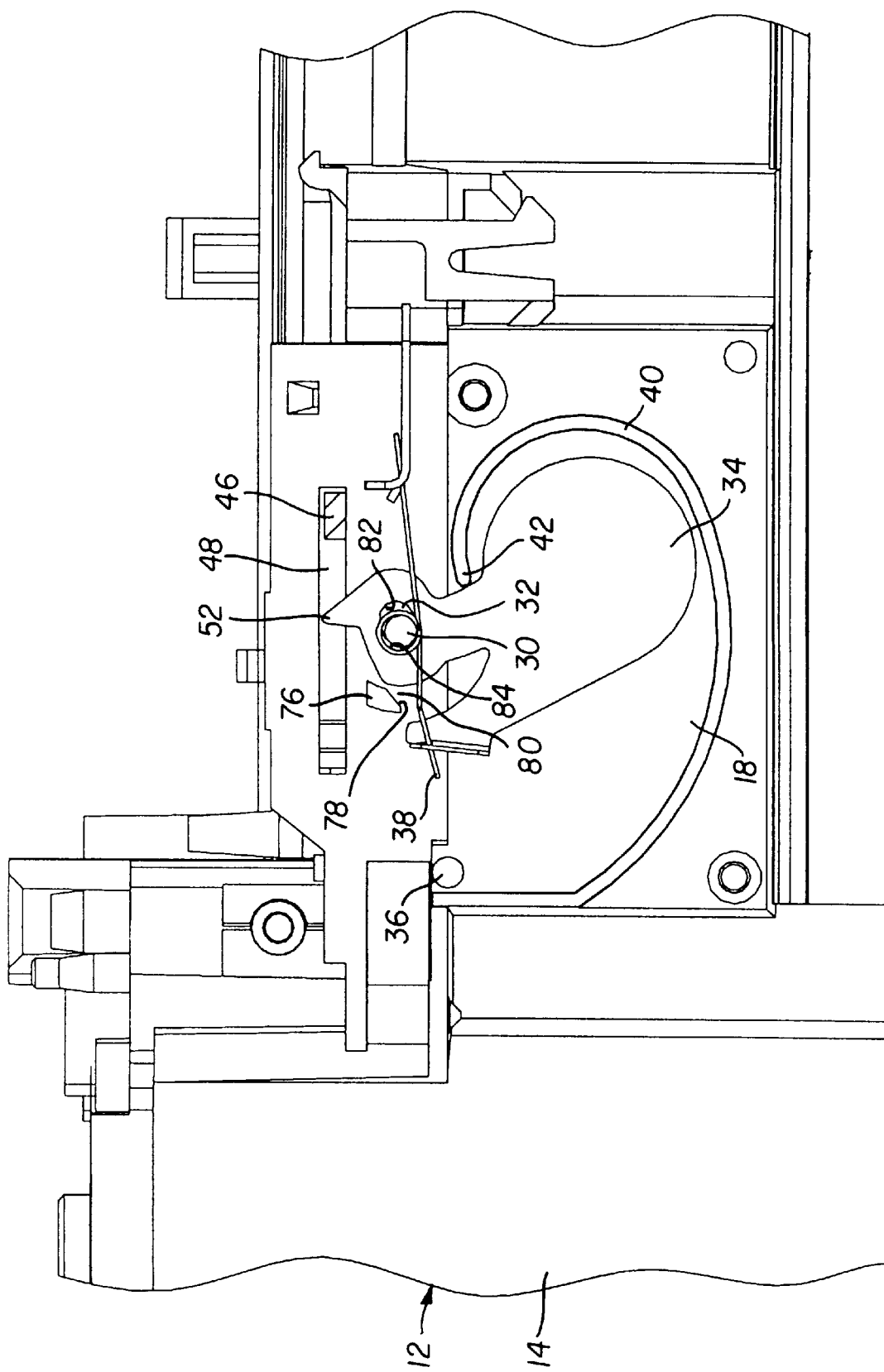

When the shutter actuator 44 has been moved past the tang 52 on the shutter blade 34, as shown in FIGS. 6 and 7, the closing spring 38 pivots the shutter blade closed counter-clockwise to re-cover the aperture 20. The shutter blade 34 is pivoted closed with the second closed end 84 of the slot 32 in the shutter blade being against the pivot pin 30 in FIG. 7.

Figure 8:
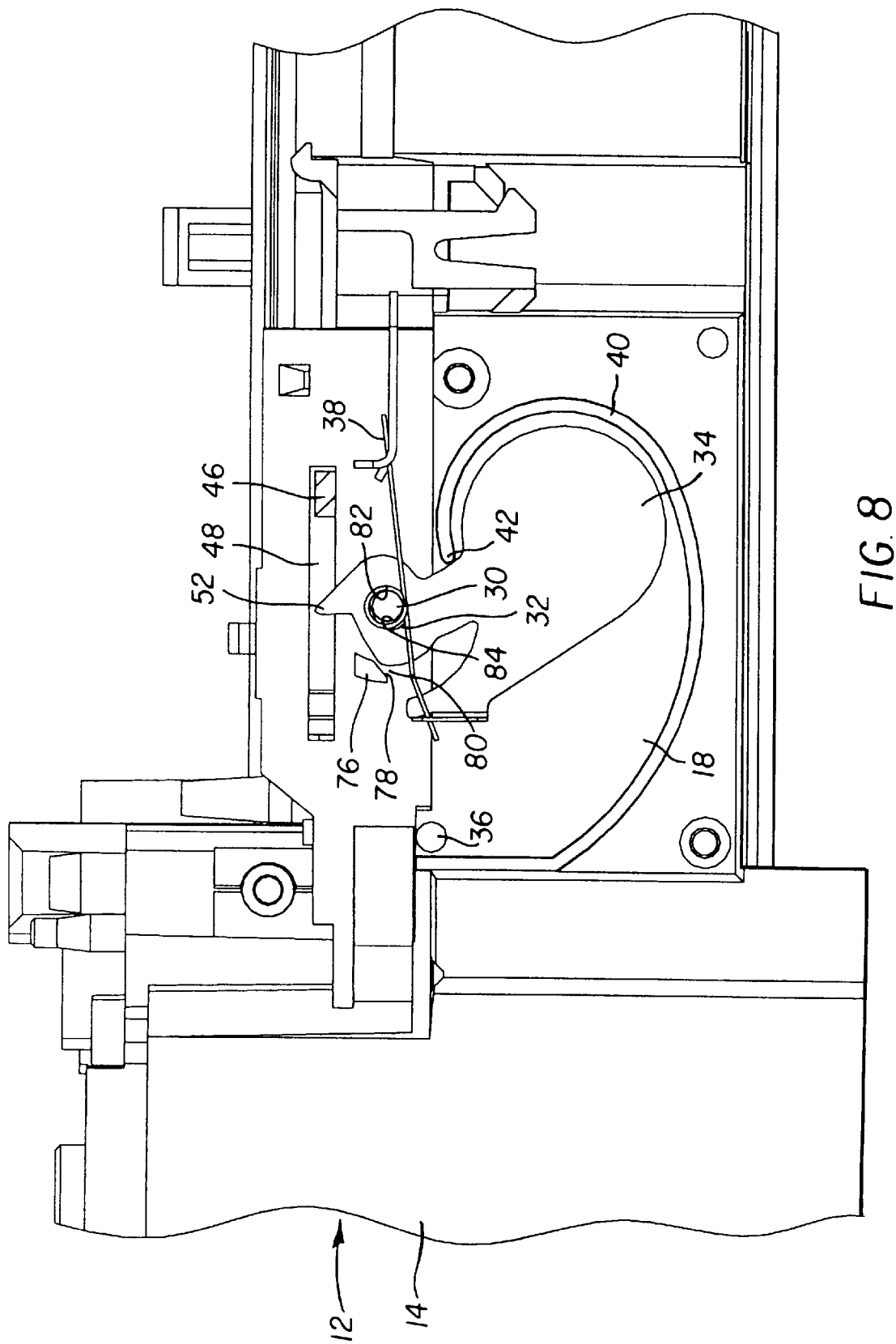
Figure 9:
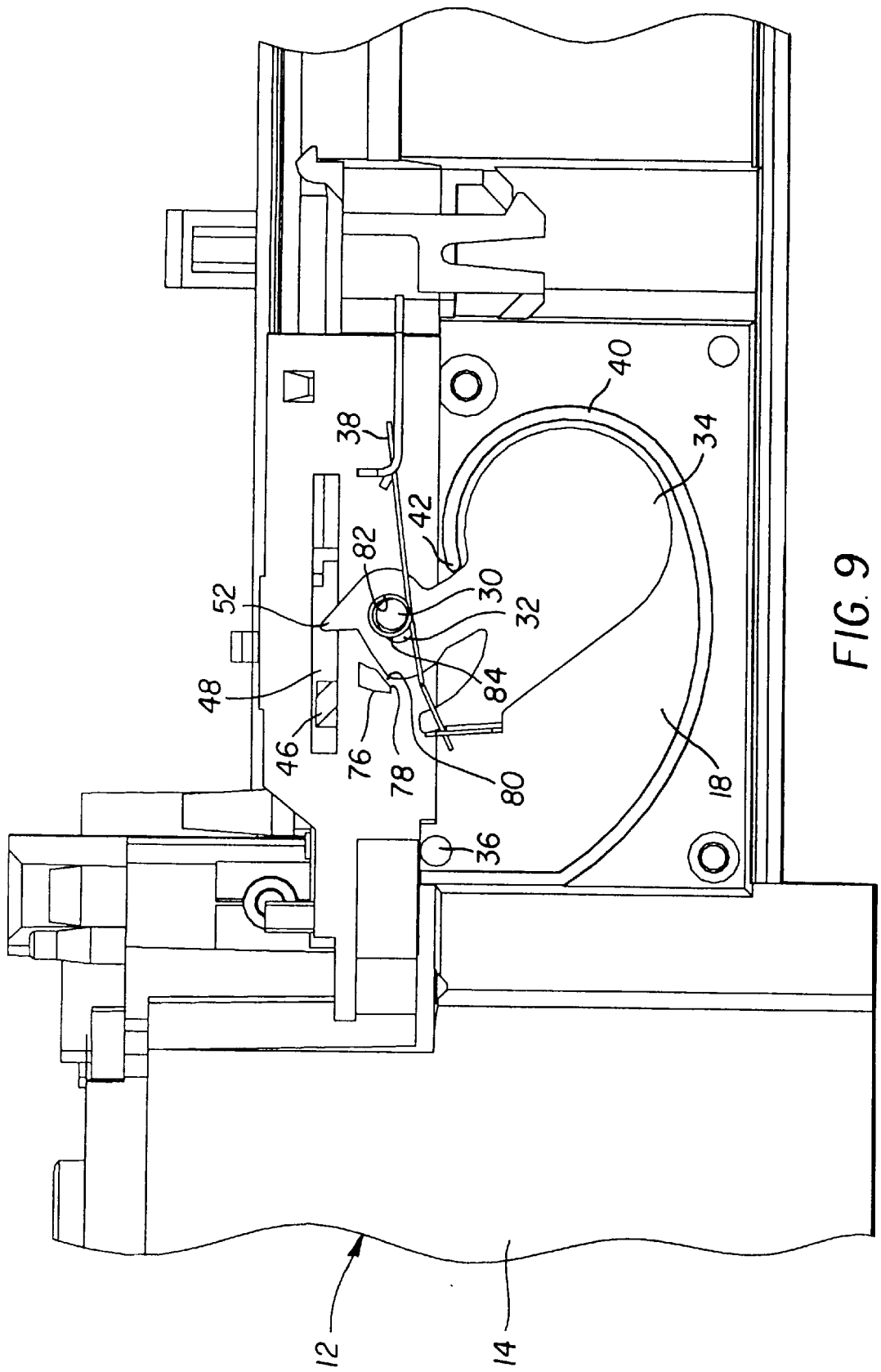

In FIG. 8, the closing spring 38 pivots the shutter blade 34 slightly counter-clockwise to return to the blade stop end 42 of the light-intercepting rib 40 and slightly further about the blade top end. This allows the closing spring 38 to translate the shutter blade 34 slightly to the left in FIG. 8 to change from the second closed end 84 of the slot 32 in the shutter blade being against the pivot pin 30 to the first closed end 82 of the slot being against the pivot pin Then, as shown in FIG. 9, the shutter blade 34 is returned to within the blocking range 80 of the inclined blocking edge 78.

When the shutter release button 66 is no longer manually depressed, its depending projection 68 is swung away from the upstanding projection 70 on the locking member 54. This allows the return spring 64 to pivot the locking member 54 clockwise in FIGS. 1 and 2 for the actuator lock 56 to re-engage the upstanding pin 58 on the shutter actuator 44 and for the thumbwheel lock 60 to re-engage any one of the peripheral teeth 62 on the film winding thumbwheel 22. The shutter actuator 44 is previously returned to the left in FIG. 9, to position its upstanding pin 58 for re-engagement with the actuator lock 56, when the film winding thumbwheel 22 is manually rotated counter-clockwise in FIG. 1 to wind the last imaging section of the filmstrip exposed at the exposure chamber 18 into the film cartridge in the cartridge receiving chamber 14 and to advance a fresh imaging section of the filmstrip from the film supply chamber 16 to the exposure chamber. While the shutter actuator 44 is moved to the left in FIG. 9, the actuating protuberance 46, which protrudes from the slot 48 in the main body part 12, is slight retracted in the slot (as compared with when the shutter actuator is moved to the right in FIGS. 2–6) to be able to avoid contact with the tang 52 on the shutter blade 34.

When the camera 10 is dropped or jarred, the mechanical shock may cause the shutter blade 34 to be slightly pivoted clockwise in FIG. 10 to separate from the blade stop end 42 of the light-intercepting rib 40. The closing spring 38 maintains the first closed end 80 of the slot 32 in the shutter blade against the pivot pin 30. Consequently, the shutter blade 34 is pivoted against the inclined blocking edge 78 (closing the slight space or gap 80 which is shown in FIG. 2) to prevent the shutter blade from being pivoted open to uncover the aperture 20. Then, the closing spring 38 returns the shutter blade 34 to against the blade stop end 42 of the light-intercepting rib 40 and separates the shutter blade from the inclined blocking edge 78 (re-effecting the slight space or gap 80 as shown in FIG. 2).

The invention has been described with reference to a preferred embodiment. However, it will be appreciated that variations and modifications can be effected by a person of ordinary skill in the art without departing from the scope of the invention.

Parts List 10. one-time-use camera
12. main body part
14. cartridge receiving chamber
16. film supply chamber
18. exposure chamber
20. aperture
22. film winding thumbwheel
24. taking lens
26. lens plate
28. lens retainer
30. pivot pin
32. slot
34. shutter blade
36. limit stop
38. closing spring
40. light-intercepting rib
42. blade stop end
44. shutter actuator
46. actuating protuberance
48. slot
50. actuating spring
52. tang
54. locking member
56. actuator lock
58. upstanding pin
60. thumbwheel lock
62. peripheral teeth
64. return spring
66. shutter release button
68. depending projection
70. upstanding projection
72. frame counter
74. viewfinder
76. blocking device
78. inclined blocking edge
80. blocking range (clearance space or gap)
82. first closed end
84. second closed end

What is claimed is:

1. A camera comprising an aperture through which ambient light is passed to cause a film exposure, a shutter blade movable open to uncover said aperture to permit ambient light to pass through said aperture and movable closed to re-cover said aperture and susceptible of being moved accidentally due to mechanical shock such as when said camera is dropped or jarred, and a shutter actuator movable to move said shutter blade open to uncover said aperture, is characterized in that:

a blocking device is positioned adjacent said shutter blade to prevent said shutter blade from being moved open to uncover said aperture when said shutter blade is moved accidentally due to mechanical shock, and to permit said shutter blade to be moved open to uncover said aperture when said shutter actuator is moved to move said shutter blade open.

2. A camera comprising an aperture through which ambient light is passed to cause a film exposure, a shutter blade pivotable open to uncover said aperture to permit ambient light to pass through said aperture and pivotable closed to re-cover said aperture and susceptible of being moved accidentally due to mechanical shock such as when said camera is dropped or jarred, and a shutter actuator movable to pivot said shutter blade open to uncover said aperture, is characterized in that:

a blocking device is positioned within a blocking range of said shutter blade to block said shutter blade from being pivoted open to uncover said aperture when said shutter blade is moved accidentally due to mechanical shock; and said shutter blade is supported to be moved out of the blocking range of said blocking device when said shutter actuator is moved to pivot said shutter blade open to uncover said aperture.

3. A camera as recited in claim 2, wherein said blocking device is immovably fixed in place.

4. A camera as recited in claim 2, wherein said shutter blade is supported to be translated to be moved out of the blocking range of said blocking device.

5. A camera as recited in claim 2, wherein a closing spring biases said shutter blade to be pivoted closed to re-cover said aperture and to prevent said shutter blade from being translated to be moved out of the blocking range of said blocking device when said shutter blade is moved accidentally due to mechanical shock.

6. A camera as recited in claim 4, wherein said shutter blade is positioned in the way of said shutter actuator for said shutter actuator to translate said shutter blade to be moved out of blocking range of said blocking device when said shutter actuator is moved to pivot said shutter blade open.

7. A camera as recited in claim 6, wherein said shutter blade has a slot with a pair of first and second opposite closed ends, and a fixed pivot pin projects into said slot to support said shutter blade to be translated to change from said first closed end of said slot being against said pivot pin to said second closed end of said slot being against said pivot pin and to be pivoted open to uncover said aperture and closed to re-cover said aperture when said second closed end of said slot is against said pivot pin.

8. A camera as recited in claim 7, wherein said closing spring biases said shutter blade to be pivoted closed to re-cover said aperture and to be translated to change from said second closed end of said slot being against said pivot pin to said first closed end of said slot being against said pivot pin.

9. A camera as recited in claim 8, wherein a light-intercepting rib is configured to partially surround said shutter blade when said shutter blade is closed and has a blade stop portion which acts as a fulcrum to allow said closing spring to translate said shutter blade to change from said second closed end of said slot being against said pivot pin to said first closed end of said slot being against said pivot pin.

10. A camera comprising an aperture through which ambient light is passed to cause a film exposure, a shutter blade movable open to uncover said aperture to permit ambient light to pass through said aperture and movable closed to re-cover said aperture and susceptible of being moved accidentally due to mechanical shock such as when the camera is dropped or jarred, and a shutter actuator movable to move said shutter blade open to uncover said aperture, is characterized in that:

a blocking device is positioned within a blocking range of said shutter blade to block said shutter blade from being moved open to uncover said aperture when said shutter blade is moved accidentally due to mechanical shock; and said shutter blade is supported to be translated to be moved out of the blocking range of said blocking device when said shutter actuator is moved to move said shutter blade open to uncover said aperture.

* * * * *